United States Patent [19]

Inoue

[11] 4,324,969
[45] Apr. 13, 1982

[54] ELECTRICAL DISCHARGE MACHINING SYSTEM WITH OPTICAL ISOLATION OF A GAP MONITOR FROM REMOTE CONTROL CIRCUIT

[75] Inventor: Kiyoshi Inoue, Tokyo, Japan

[73] Assignee: Inoue-Japax Research Incorporated, Yokohama, Japan

[21] Appl. No.: 118,791

[22] Filed: Feb. 5, 1980

[51] Int. Cl.³ .............................................. B23P 1/02
[52] U.S. Cl. ................................ 219/69 C; 219/69 G
[58] Field of Search .......................... 219/69 G, 69 C; 250/551; 350/96.15

[56] References Cited

U.S. PATENT DOCUMENTS

| | | | |
|---|---|---|---|
| 3,843,864 | 10/1974 | Wohlabaugh | 219/69 G |
| 3,878,397 | 4/1975 | Robb et al. | 250/551 |
| 3,987,271 | 10/1976 | Bell, Jr. et al. | 219/69 C |
| 4,161,650 | 7/1979 | Caouette et al. | 350/96.15 |

Primary Examiner—C. C. Shaw
Attorney, Agent, or Firm—Karl F. Ross

[57] ABSTRACT

An electrical discharge machining (EDM) system comprising: a mechanical unit constituting an EDM machine tool, a power-supply unit for providing a succession of machining pulses controlledly to an EDM gap formed between a tool electrode and a workpiece in the mechanical unit, a machining-fluid supply unit for delivering a machining fluid controlledly to the EDM gap, an electrical control unit disposed remote from the EDM gap for controlling at least one of the mechanical unit, the power-supply unit and the machining-fluid supply unit, and a gap monitoring electrical unit disposed in the vicinity of the EDM gap in the mechanical unit for providing an electrical signal representing a gap discharge condition, the gap monitoring unit having at its output an electro-optical transducer, the control circuit unit having at its input an opto-electrical transducer, the electro-optical transducer and the opto-electrical transducer being interconnected by an optical transmission line.

1 Claim, 2 Drawing Figures

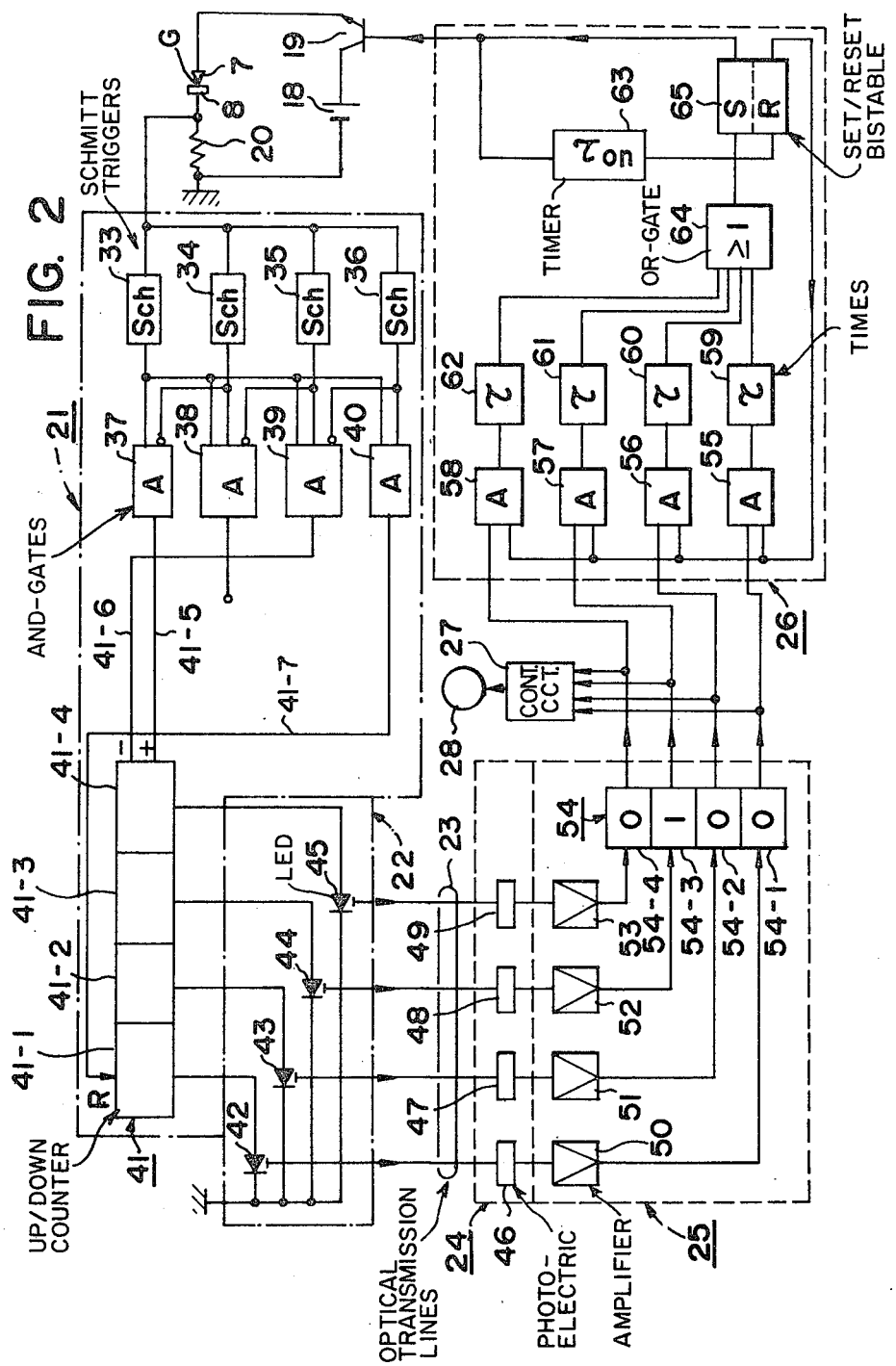

ELECTRICAL DISCHARGE MACHINING SYSTEM WITH OPTICAL ISOLATION OF A GAP MONITOR FROM REMOTE CONTROL CIRCUIT

FIELD OF THE INVENTION

The present invention relates to an electrical discharge machining (EDM) system and, more particularly, to an improved EDM system in which separate electrical functions are arranged for and interconnected by a novel coupling instrumentation.

BACKGROUND OF THE INVENTION

An EDM system commonly comprises a plurality of subsystems, i.e. a mechanical component or machine proper, a power-supply unit, a dielectric-supply unit and an dielectric-liquid control unit. The power supply provides a succession of controlled machining pulses across a machining gap formed between a tool electrode and a workpiece to create a corresponding series of electrical discharges through the dielectric-filled gap to remove material from the workpiece. The mechanical part or machine proper includes a column, a worktank and an electrode head or a work table which is associated with an electrode servo feed unit for controlledly advancing the tool electrode relative to the workpiece. The electrode head may also be equipped with a chip removal mechanism for reciprocating or cyclically retracting the tool electrode away from the workpiece, thereby facilitating the removal of machining chips from the machining area. The dielectric-supply unit is provided to handle a machining liquid medium and deliver it into the machining gap at a controlled rate or pressure. The electrical control unit is required to act on these subsystems, e.g. to adequately control the positioning of the tool electrode relative to the workpiece, the rate of relative electrode advancement and retraction, parameters for the machining pulses and the rate of delivery of the machining liquid into the gap and may also include a variety of safety and regulation arrangements including short-circuit protection and power shut-off circuitry.

The control unit must be associated with a gap monitoring electrical circuit unit which monitors the progress of machining in the gap by sensing the gap current, voltage, impedance and/or the high-frequency component in the gap voltage or current on a per-pulse or average basis, thereby judging the suitability of the gap size or physical conditions.

In a conventional EDM system, the gap detector unit electrically connected with the machining gap is disposed rather remotely from the gap site at which machining discharges actually take place or is designed to detect the voltage or current in the circuit at a point or points remote from the machining gap.

The EDM process is, however, characterized by the utilization of high-energy and high-frequency transient arc discharges. The resistance in the power-supply circuit is of an extremely low value, it being noted that it is inadequate to neglect the presence of stray capacitance and inductance in the power circuit lines. It should also be noted that the EDM gap constitutes a source of noise over a wide frequency band and does not necessarily yield a precise and reliable indication of the state of electrical discharges or machining in the EDM gap.

As detection and signal lines are lengthened, the detector and control circuits tend to malfunction due to the noise which accompanies gap discharges and the induction caused by the current passing through the power-supply lines.

In conventional EDM systems, it can be said, therefore, that the detection of the gap state has been achieved only incompletely, often accompanied by misjudgment, and control operations based upon inadequate detection have tended to lead to unsatisfactory results.

OBJECT OF THE INVENTION

It is accordingly an object of the present invention to provide an improved EDM system having detection and control arrangements capable of reliably ascertaining the physical conditions of the EDM gap and discharge characteristics instantaneously occurring therein and which are substantially immune from the induction in the machining power circuit and the noise accompanying the machining discharges.

SUMMARY OF THE INVENTION

The invention provides an improved EDM system wherein a gap detection or monitoring circuit unit is disposed in the vicinity of the EDM gap and has its monitoring electrical output converted to a corresponding optical signal which is transmitted by an optical cable to the location of a control circuit unit which is remote from the EDM gap and where it is reconverted to the original electrical signal to act on a preselected control parameter.

The gap monitoring circuit unit is preferably provided with a electromagnetic shielding. Furthermore, a control signal to be transmitted from a control circuit unit to a control panel of the EDM machine is also preferably converted to an optical signal at the input portion and the optical signal reconverted to the original electrical signal at the output portion.

Accordingly, the improved EDM system according to the present invention comprises: a mechanical unit constituting an EDM machine tool, a power-supply unit for providing a succession of machining pulses controlledly to an EDM gap formed between a tool electrode and a workpiece in the mechanical unit, a machining-fluid supply unit for delivering a machining fluid controlledly to the EDM gap, an electrical control unit disposed remote from the EDM gap for controlling at least one of the mechanical unit, the power-supply unit and the machining-fluid supply unit, and a gap monitoring electrical unit disposed in the vicinity of the EDM gap in the mechanical unit for providing an electrical signal representing a gap discharge condition, the gap monitoring unit having at its output an electro-optical transducer and the control circuit unit having at its input an opto-electrical transducer, the electro-optical transducer and the opto-electrical transducer being interconnected by an optical cable or by optical transmission lines.

BRIEF DESCRIPTION OF DRAWING

In the accompanying drawing:

FIG. 2 is a circuit schematic diagrammatically illustrating the system of FIG. 1.

SPECIFIC DESCRIPTION

Figure 1:
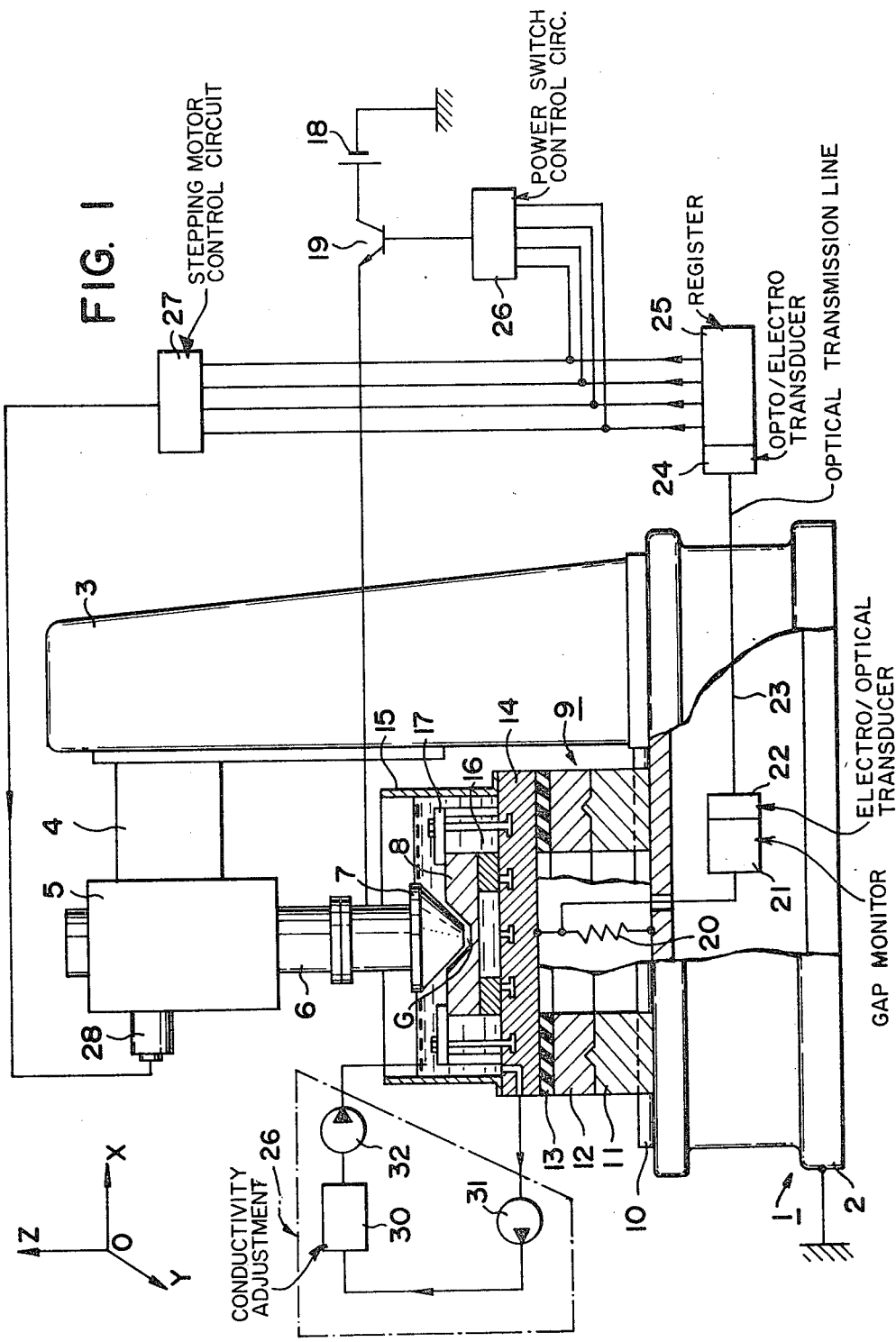
FIG. 1 is a schematic view partly elevational, partly in section and partly in block from diagrammatically illustrating an improved EDM system embodying the present invention.

The EDM system shown in FIG. 1 includes a machine-tool or mechanical unit 1 comprising a machine bed 2, a column 3, an arm 4 and an electrode head 5 assembled together in a usual manner. A spindle 6 is carried by the head 5 as movable vertically and has at its lower end a tool electrode 7 attached thereto. A workpiece 8 is juxtaposed with the tool electrode 7 and is carried by a cross-table arrangement 9 which is in turn mounted on the machine bed 2. The cross-table arrangement 9 includes a guide member 10 for an x-axis displacement table 11 which in turn carries a Y-axis displacement table 12. An electrically nonconductive plate 13 is disposed between the carrier table 12 and a worktable 14 on which a worktank 15 is formed and stands 16 carry the workpiece 8 to electrically insulate the workpiece from the machine base 2. Clamp members 17 are used to fixedly mount the workpiece on the worktable 14 in the worktank 15.

The system shown also includes an EDM power supply comprising a DC source 18 and a power switch 19 shown by a transistor adapted to be turned on and off alternately to provide a succession of machining pulses across an EDM gap G between the tool electrode 7 and the workpiece 8. One terminal of the DC source 18 and the machine base 2 are both grounded to retain the same potential.

In an internal space of the cross-table arrangement 9 there is disposed a gap sensing resistor 20 which electrically bridges between the worktable 14 and the machine base 2 so as to constitute a conductor in series with the DC source 18, the switch 19 and the EDM gap G and hence to serve to sense the gap current passing between the tool electrode 7 and the workpiece 8. The sensing resistor 20 is associated with a gap monitoring unit 21 which is shown installed with the machine base 2 but may also be disposed in the internal space of the cross-table arrangement 9. The gap monitoring unit 21 has an electro-optical transducer 22 provided at its output to convert the gap electrical signal derived by the unit 21 into an optical signal.

The optical signal is transmitted by an optical cable or transmission line 23 comprising a bundle of optical fibers of a design well known in the optical communication art to an opto-electrical transducer 24 provided at the input of a register 25 constituting a portion of a control unit. The remainder of the control unit shown includes a control circuit 26 for the power switch 19 and a control circuit 27 for a stepping motor 28 used to controlledly advance the tool electrode 7 in the direction of the workpiece 8. A dielectric-supply unit 29 comprising a conductivity-adjusting vessel 30 and a pair of pumps 31 and 32 is also shown and may be operated by the output of the register 25.

Referring to FIG. 2, the discharge monitoring circuit unit 21 is shown comprising Schmitt-trigger circuits 33, 34, 35 and 36, AND gates 37, 38, 39 and 40, and an up/down counter 41. The electro-optical transducer 22 may comprise four light-emitting elements (diodes) 42, 43, 44 and 45.

The Schmitt-trigger circuit 33 has its triggering level set at an extremely low value and is provided to sense the commencement of an electrical discharge between the tool electrode 7 and the workpiece 8. It is the function of this element to detect the occurrence of a gap electrical discharge which may be of minute current. The Schmitt-trigger circuits 34 and 35 are triggered when the discharge current detected through the sensing resistor 20 exceeds a minimum and maximum permissible values Imin and Imax set therefor, respectively. The Schmitt-trigger circuit 36 has its triggering level set to be slightly higher than that of the Schmitt-trigger circuit 35.

The output of the Schmitt-trigger circuit 33 is applied to the four AND gates 37 to 40. The outputs of Schmitt-trigger circuits 34, 35 and 36 are applied directly to the AND gates 38, 39 and 40, respectively and also via inverter gates to the AND gates 37, 38 and 39, respectively.

It is seen therefore that when the discharge current detected is of a current lower than the minimum value Imin, only the Schmitt-circuit 33 is triggered. Since the other circuits 34 to 36 are each in an untriggering state, only the AND gate 37 is turned to provide a "1" output while the other AND gates 38 to 40 retain an "0" output.

When the discharge current detected exceeds the minimum value Imin but is lower than the maximum value Imax, the Schmitt circuits 33 and 34 are triggered to cause only the output of the AND gate 38 to be turned to "1". When the discharge is of a current which exceeds the value Imax but is not sufficient to cause the circuit 36 to be triggered, only the output of the AND gate 39 is turned to 1. When an abnormal, excessive discharge is generated which is of a greater current, only the output 40 is turned to "1".

The up/down counter 41 shown is of one having four-bit displays 41-1, 41-2, 41-3 and 41-4 and also a count-up terminal 41-5, a count-down terminal 41-6 and a reset input terminal 41-7 adapted to receive the output pulses of AND gates 37, 39 and 40, respectively.

In the state shown, the display 41-3 is actuated to indicate the state "1" to cause the corresponding light-emitting element 44 to illuminate. In this state, when the count-up terminal 41-5 is furnished with an output pulse of the AND gate 37, the display indicating "1" is shifted to 41-4. When this state is established, no shifting takes place if there is a further input to the count-up terminal 41-5.

The count-down terminal 41-6 is furnished with an output pulse from the AND gate 39. Each time it is furnished, the display indicating "1" is shifted by one bit and this continues until the portion 41-1 is reached.

Furthermore, when the reset terminal 41-7 is furnished with an output pulse of the AND gate 40, the "1" display is shifted, regardless of its particular previous position, to the portion 41-1.

The first to fourth display portions 41-1 to 41-4 of the four bit display counter 41 are arranged to correspond to the four light-emitting elements 42 to 45, respectively. A light-emitting element is illuminated which corresponds to a display that indicates the "1" state. The light signal is transmitted through the optical transmission line, i.e. optical cable, to the photo-electrical transducer 24.

The photo-electrical transducer 24 comprises four photo-electrical converting elements 46 to 49. The input register 25 comprises amplifiers 50 to 53 and a memory 54.

The switching control circuit 26 for the EDM power switch 19 comprises AND gates 55 to 58, timers 59 to 62 which adjustably sets a time interval τoff between successive machining voltage pulses, a timer 63 for setting the duration τon of machining pulses, an OR gate 64 and an RS bistable element 65.

The memory 54 is used to memorize the same contents as indicated by the display of the up/down counter 41 and the memorized data are transmitted to the switching control circuit 26 and to the stepping-motor control circuit 27.

The stepping-motor control 27 operates to drive the stepping-motor 28 at a rate determined by the record position in the memory 54-1. Thus, the stepping motor 28 is rotated at a maximum rate when the record position of the memory 54 lies at the uppermost bit 54-4 and at a slower rate as the record position is shifted to a lower bit. The machining feed of the electrode 7 relative to the workpiece 8 is effected accordingly. If the record position stays at the lowest bit 54-1 for a predetermined period of time, the rotation of the stepping motor 28 is reversed and driven quickly to allow a reciprocation of the tool electrode 7. Besides controlling the advance rate of this category, various modes of servo control are possible. In the case of a differential servo control operation, for example, the switching of a reference voltage supply may be effected.

In the switching control circuit 26, the inversion of the bistable device 65 to the set state causes the switching element 19 to be conducting to allow a voltage from the power supply 18 to be applied between the tool electrode 7 and the workpiece 8 thereby permitting an electrical discharge to be effected across the machining gap G and at the same time causes the timer 63 to operate. The timer 63 upon lapse of a predetermined time $\tau$on provides a short output pulse to reset the RS bistable device 65. Then, the switch 19 is rendered nonconducting and the timer corresponding to the record position of the memory 54 is actuated. In the state shown, the record position of the memory 54 lies at the bit 54-3 so that the reset signal of the RS bistable device 65 operates the timer 61 via the AND gate 57.

The timer interval or off-time $\tau$off between successive machining voltage pulses is set at various values at timers 59 to 62. Here, the timer 59 provides a longest off-time $\tau$off and timers 60, 61 and 62 provide successively reduced values for the off-time $\tau$off. The timer 59, 60, 61, 62 is thus selectively actuated according to the foregoing process and, upon expiration of a particular time-duration $\tau$off set therein, provides a short output pulse which feeds via the OR gate 64 into the set terminal of the RS bistable device 65 to bring it into a set state. The process is effected cyclically and a succession of machining pulses ensue.

In the course of electrical discharge machining with the control arrangement shown, when an electrical discharge which is too weak in the machining action is created, the 1-display position of the up/down counter 41 and the 1-record position of the memory 54 are stepped up to their respective uppermost bits. This causes the tool electrode 7 to be advanced at a greater rate and the pulse interval $\tau$off to be reduced. On the contrary, when an electrical discharge which exceeds in intensity a preselected maximum permissible extent occurs, the 1-record position of the memory 54 is stepped down to the lowermost bit to cause the rate of electrode advancement to be reduced and the pulse off-time $\tau$off to be increased.

In the arrangement shown, the sensing resistor 20 and the associated unit 21 for monitoring the discharge state in the gap G in response to the input terminal voltage are disposed in the vicinity of the machining gap G. Locating this unit at a zone in which it is substantially completely shielded from the electro-magnetic radiation insures a reliable detection of the discharge condition in the gap without influence of the noise generated in the discharge site. Furthermore, the use of an optical transmission line to transmit the detection signal in the present system makes it to be substantially immune from the induction by the machining current and power circuit to allow a desired control operation to be accomplished with reliability.

It would be appreciated that implementations of the present invention are not limited to the particular embodiment illustrated. Thus, any possible form of determination of gap discharge conditions, any possible choice of gap variables for detection, any possible arrangement of logic circuits, any practicable form of electrode feed and any particular form of the application of machining pulses may be employed. Furthermore, the illustrated system can be modified such that electro-optical transducer elements 42 to 45 may be operated directly by output pulses of Schmitt-trigger circuits 33 to 36 or by output pulses of AND gates 37 to 40 to provide converted optical signals for transmission by the optical cable 23.

In the illustrated system, the sensing resistor 20 is shown installed in the cross table and the associated gap monitoring unit in the machine base, although it should be noted that these may alternatively be located within the spindle 5, the electrode head 5, the arm 4 or the column 3, thus essentially in the vicinity of the EDM gap.

It should be noted that the present invention is applicable to not only a sinking-type EDM but also a wire-cut EDM system.

What is claimed is:

1. An electrical discharge machining (EDM) system comprising:

mechanical components including a tool electrode forming an EDM gap with a workpiece and assembled together to form an EDM machine tool;

power supply means connected to said EDM gap for providing a succession of machining pulses controlledly across said gap between said tool electrode and said workpiece in said EDM machine tool;

machining fluid supply means connected with said EDM machine tool for delivering a machining fluid controlledly to said gap;

drive means operatively connected to at least one of said mechanical components for relatively displacing said tool electrode and said workpiece;

a electrical control circuit unit disposed remote from said gap for controlling at least one of said means;

a gap-monitoring electrical circuit unit disposed remote from and spaced from said electrical control circuit unit and installed in a chamber at a portion of said mechanical components located in the vicinity of said EDM gap for providing a plurality of electrical monitoring signals representing different classes of gap discharge conditions, said gap monitoring circuit unit having an output provided with a plurality of electro-optical transducers assigned to said different classes of gap discharge conditions for converting said electrical monitoring signals to corresponding optical signals respectively; and an optical transmission line comprising a plurality of optical conductors bundled together, each of said conductors being coupled to a respective one of said electro-optical transducers in said gap monitoring electrical circuit unit, said optical conductors leading out of said chamber and across a space between said chamber and said electrical control circuit unit, into said electrical control circuit unit for transmitting across said space and between said electrical control circuit unit and said gap monitoring electrical circuit unit, said optical signals individually, said control circuit unit having an input provided with a plurality of opto-electrical transducers each coupled to a predetermined one of said optical conductors for reconverting said optical signals to respective electrical monitoring signals, said control circuit unit having logic circuit means responsive to said reconverted electrical monitoring signals for producing control signals for controlling said at least one of said means.

* * * * *